3,749,638
FORMATION OF NON-WOVEN STRUCTURES FROM FIBROUS GLASS DISPERSION
Laurent C. Renaud, Woonsocket, R.I., and Clarence W. Charon, South Attleboro, Mass., assignors to Owens-Corning Fiberglas Corporation
No Drawing. Filed Jan. 11, 1971, Ser. No. 105,713
Int. Cl. D21h 5/18
U.S. Cl. 162—145                               20 Claims

ABSTRACT OF THE DISCLOSURE

A process for completely dispersing glass filaments with a minimum of filament breakage which produces stable dispersions in substantially a neutral solution which process includes dispersing the filaments in an acidic medium at a pH of from about 2.0 to about 2.5 to form a mixture, agitating the mixture and raising the pH of the mixture to about 4.5 to 6.5.

BACKGROUND OF THE INVENTION

This invention relates to the field of wet processes for making non-woven structures.

The use of glass fibers in paper making has long been known. Glass fiber paper was produced on production equipment as early as the 1930's. Since that time, very fine blown micro-fibers, coarse glass fibers and even glass flakes have been used to produce specialty papers. These papers have been produced in all-glass form and in admixes with cellulose, asbestos and other fibers. The use of blown micro-fibers and coarse glass fibers alone or in combination with other fibers such as asbestos for high temperature filtration or controlled porosity is disclosed in the prior art. Also disclosed, is the use of glass fibers and wood pulp to control dimensional stability for sandpaper products.

Newly developed glass fibers, the finest diameter commercially available fibers produced by primary attenuation, having a nominal diameter of approximately only 3.8 microns, prompted reinvestigation in the areas of glass fiber papers and glass fiber/pulp admixtures. Not only do these fibers possess the well-known properties of other glass fibers such as high tensile strength, dimensional stability, thermal stability, inertness, nonflammability, etc. but they are also the softest, most pliable textile fiber known to man. It is seven times softer than 1½ denier viscos fibers, fourteen times softer than 1½ denier polyester fibers and thirty-six times softer than 9 micron diameter glass strand. This degree of softness is assumed to be directly related to bending stiffness. Another unique feature of thee new fibers is the number of filaments per unit weight. These fibers are described as a ¼ denier fiber and therefore have six times as many filaments as an equal weight of 1½ denier synthetic fiber or of 9 micron diameter glass strand. This very large number of filaments per unit weight, combined with the controlled uniformity of the fiber diameter and uniformity of length makes it possible to produce very light-weight sheets which have good strength and very appealing aesthetics. However, the above properties of the newly developed glass fibers and the fact that the fibers are sized with a protective coating and then gathered into a strand make it impossible to disperse the fibers by previously known techniques. The previously known techniques of dispersion degraded continuously attenuated glass fibers, especially the newly developed fibers of 3.8 micron diameter when trying to separate the individual filaments from the fiber bundle.

A new procedure was conceived and developed to disperse these fibers without severe fiber breakage. Although it is still necessary to use a strong acidic solution to obtain initial fiber dispersion, with our new procedure it is unexpectedly possible to raise the pH to substantially the neutral point and still maintain a stable fiber dispersion. This feature of raising the pH after the dispersion of the fibers heretofore was not possible without reagglomerating the glass fibers. An important advantage of this dispersion technique is that it eliminates machine corrosion and cellulose degradation, problems previously associated with the use of glass fibers by the paper industry.

Some of the problems in the prior art include the poor quality of non-woven structures due to holes, bumps, etc. when micro-fibers are used because of beads and shot therein. Micro-fibers are defined as B, A, AA, AAA, AAAA, and AAAAAA diameter fibers, formed by secondary flame attenuation; these fibers have a wide range of fiber diameter, and the fiber length is very short and non-uniform. Chopped coarse fibers also presented problems, in that in the past they could not be dispersed alone without substantial fiber breakage and reagglomeration. Also the combination of coarse fibers and micro-fibers did not produce structures possessing great strength, or appealing aesthetics.

Some of the problems solved by using the inventive concepts include higher quality, stronger structures, better dispersibility of finer diameter fibers, and less breakage of fibers during the dispersion operation. The inventive concepts permit higher pH levels of the slurry of glass fibers after initial dispersion than heretofore was possible. Substantially neutral dispersions are now possible, which substantially eliminate corrosion problems on equipment used to produce non-woven structures. Furthermore, the substantially neutral glass fiber dispersions allow blending with other fibers or pulps which could be degraded by strong acidic solutions. The inventive concept also provides a greater degree of stability in the dispersions, so that reagglomeration does not occur over long periods of time; this was not possible prior to now.

SUMMARY OF THE INVENTION

As the glass fiber industry becomes more sophisticated and produces glass filaments having finer diameter, problems of dispersibility with these fibers become greatly magnified. The finer glass filaments tend to curl, break, and reagglomerate when dispersed, but they also give other advantages not possessed by the coarser fibers, or by blown micro-fibers.

In summary, the inventive concept completely disperses very fine diameter glass filaments from chopped strands or bundles comprising a multiplicity of sized glass filaments. The dispersion is controlled in such a manner that the fine diameter glass filaments do not excessively break or reagglomerate after dispersion. The inventive dispersion technique however, is not limited to fine diameter glass fibers only, but rather is necessary for the dispersion thereof. When the concept is applied to coarser fibers of up to and including 12 micron diameter, formed from primary attenuation, properties of the structures formed therefrom are greatly improved over structures formed by prior art techniques.

Some of the advantages of using the inventive concept include the production of a 100 percent glass structure which is a non-woven web having greater porosity than conventional webs or paper of that weight and/or thickness. Also, such properties as dimensional stability, flame proofness, uniformity of fiber distribution, uniformity of thickness, smoothness of surface, absence of fiber clumps, break strength, and tear strength are greatly improved.

The inventive concept can be used on commercial paper-making equipment which is normally used for producing synthetic or long fiber paper. When blends of glass and other materials such as pulp, cotton, rag, asbestos, etc. are employed, the previously mentioned advantages of using glass in these mixtures are obtained without subjecting the non-glass fibers to strong acids. The resultant dispersion, when used to form a non-woven structure, yields improved properties.

The use of the inventive concepts with very fine fibers allows for lower concentrations of glass fibers in the non-woven structures because of the greater number of filaments per unit weight, and the resulting product has more flexibility, smoothness, whiteness, and opaqueness than that obtainable from the prior art. This is also true with admixes comprising fine diameter glass fibers and wood pulp, for example. These glass fibers quicken the rate of drainage of newly formed structures, not only because of their presence, but also because of the lower concentrations.

Controlling the pH of our system at approximately 2.5 and below during initial mixing or dispersing and thereafter controlling the pH at approximately 4.5 to 6.5, in conjunction with the use of finer diameter glass fibers allows the attainment of properties and aesthetics in a non-woven structure which heretofore were unobtainable.

The products formed by the inventive concept find utility in the following areas: high pressure laminates for electrical and decorative applications; wet and dry filtration; flexible electrical insulation; coating substrate; backing and cross-banding substrate for furniture and formica; window shades and disposable draperies; interliners and stiffeners for clothing and upholstery; disposable protective clothing for lab coats, etc.; surfacing mat for flat laminates; facing material for wall covering, pipe wrap and ceiling tile; carpet backing; tire chaffer, aircraft honeycomb; and lampshades.

It is therefore an object of this invention to provide a process for treating glass fibers in order to make the fibers adaptable to paper-making techniques and equipment.

It is another object to prepare a slurry, comprising glass fibers, in such a manner that the fibers completely disperse with a minimum of breakage or damage, and which fibers, once dispersed, do not reagglomerate.

It is still another object to subject sized glass fibers in the form of chopped strands and bundles to a first treatment having a low pH and subsequently subjecting the fibers to a second treatment having a higher pH.

It is an additional object to prevent the dispersed glass fibers from reagglomerating, and to increase the stability of the dispersed fibers.

It is still a further object to treat very fine diameter glass fibers in such a manner that lower concentrations of the fibers can be used in order to provide additional flexibility, smoothness, and porosity to non-woven structures produced from the treated fibers.

As the fiber diameter is decreased, lighter structures are produced with corresponding increase in strength, whereas when the fiber diameter is increased there is an insufficient amount of filaments to provide proper web formation at the same weight as the lighter structure using the fine fibers. Therefore through the inventive concept, a structure is obtained which heretofore was unobtainable, i.e. lighter in weight, stronger, and more opaque than structures produced from micro-fibers or coarse fibers.

When the formed structures are treated with resinous materials, the properties of the structures, such as softness, drape, etc. are greatly improved.

DESCRIPTION OF THE PREFERRED EMBODIMENTS

The dispersion technique of our invention provides a uniform aqueous dispersion of glass fibers, which dispersion possesses stability against reagglomeration of the fibers over extended periods of time.

Extensive investigation has demonstrated that prior dispersion techniques are not suitable to disperse very fine glass fibers formed from textile glass handling apparatus. Textile fibers are formed by rapid attenuation of a plurality of molten streams of glass and coated with a protective sizing prior to being gathered into a bundle. The sizing usually contains a film former in addition to softeners, lubricants, etc. to protect the individual glass fibers from mutual abrasion.

In the past, blown micro-fibers of glass or glass wool were subjected to various dispersion techniques, but these techniques were not sufficient to disperse bundles of glass fibers. A bundle of glass fibers is much more difficult to disperse because of a multiplicity of reasons, including the large number of fibers per unit weight and the sizing which produces an integral bundle. Textile fibers are also of more uniform diameter than blown micro-fibers. In comparison, glass wool, having varied fiber diameters and no sizing thereon, comprises a plurality of discrete individual fibers, thereby making dispersion thereof much easier than with bundles of glass fibers.

Synthetic fibers, even in bundles, are also different from glass fibers in bundles, because the former usually only have a lubricant thereon, thereby making the dispersion much easier.

It is still necessary to use strongly acidic mediums to obtain initial fiber dispersions, but the use of these mediums is restricted to a mixing chest. Subsequently, the pH of the meduim is raised prior to associating the fibrous dispersion with the paper-making apparatus. Mineral acids, such as sulfuric acid and hydrochloric acid are used to adjust the pH of an aqueous medium to between about 2.0 and 2.5. Moderate agitation, with good tumbling action, produces uniform dispersions of from about 0.5 percent to about 1.0 percent by weight of glass fibers. The addition of particulate materials, such as clays, improves the dispersion quality and stability. Hydrous aluminum silicate is the preferred clay. Particulate materials, such as wood pulp and asbestos, also produced uniform dispersions, but these dispersions, similar to prior art dispersions, are only stable at a pH of 3.0 and below.

One of the most significant aspects of the inventive concept is the discovery that the use of sodium hexametaphosphate unexpectedly improves the wettability of the glass fibers and more important, enables the fibrous dispersions comprising specific particulate materials to remain stable at substantially neutal conditions, specifically as high as a pH of 6.5. This is extremely important because this dispersion or slurry of fibers is not corrosive to processing equipment. Furthermore, the higher pH value of the slurry ensures that when admixes are desired, that wood pulp or other synthetic fibers are not degradable when included in the glass fiber dispersion.

The preferred particular materials are of a magnitude or particle size ranging from about 0.05 microns to about 5.0 microns. Examples of these materials include hydrous aluminum silicates commercially available under the trade designation ASP-100, ASP-072 and ASP-405 from Englehard Chemicals and Minerals Corporation, and magnesium silicates such as EMTAL-599, also commercially available from Englehard Chemicals and Minerals Corporation. Attapulgus clays such as ATTAGEL-40 commercially available for Englehard Chemicals and Minerals Corporation, is another example. When the above-mentioned particulate materials are used in combination with sodium hexametaphosphate, the pH was capable of being raised without reagglomeration occurring. The sodium hexametaphosphate is commercially available under the tradenames Calgon, Metafos and Vitrofos, from Calgon Company, Essex Chemical Company, and Stauffer Chemical Company respectively.

EXAMPLE I

A procedure for dispersing glass fibers according to our invention follows: 2400 gallons of water were fed into a mixing chest. Subsequently, 15 pounds of sodium hexametaphosphate were added to the water with stirring until completely dissolved. Sulfuric acid was then added to the chest to lower the pH to about 2.0–2.5. Thirty pounds of hydrous aluminum silicate clay and 100 pounds of ¼ inch chopped glass fiber bundles were added with vigorous stirring with a Lightnin Mixer for approximately 10 to 20 minutes or until complete fiber dispersion was obtained. The time for complete dispersion increased as the diameter of the fibers used was decreased. Subsequent to complete dispersion of the fibers, the pH of the slurry was raised to about 4.5–6.5 by the addition of sodium hydroxide or ammonium hydroxide. To the slurry, a bonding agent, such as polyvinyl alcohol fibers or acrylic resin, in an amount of from 2 to 10 percent, was added in preparation of an all-glass-fiber paper on commercially available equipment. When the sheet was heated to drive excess moisture therefrom, the polyvinyl alcohol fibers were caused to dissolve and act as a binder to hold the fibers together. The resultant paper sheet possessed excellent hand, strength, opacity, and also showed that all of the glass filaments had been separated from the glass fiber bundle prior to formation of the sheet.

EXAMPLE II

To the slurry of Example I, after the pH was raised to about 4.5–6.5, cellulose (wood pulp) fibers were blended therein without any signs of degradation thereto. Amounts of from 5 to 15 percent of heavily beaten wood pulp (Canadian Freeness–50) imparted sufficient strength to the glass fiber paper produced on commercially available equipment. At this concentration, the beaten wood pulp functions as a binder.

Another bonding agent suitable to hold the fibers in place in the formed structure is an acrylic latice, such as commercially available under the tradenames RHOPLEX P–376, RHOPLEX HA–8 and RHOPLEX HA–12 from the Rohm-Haas Company. However, any resinous, natural or synthetic material is suitable as a binding agent.

The bonding agent can be added to the mixing chest or applied to the formed structure via impregnation, spraying or kiss-rolling while the structure still possesses a substantial amount of water. Where the structure possesses at leat 50 percent by weight of water its strength is adequate for processing on conventional equipment without a binder. The bonding agent may be present in the formed structure in amounts in excess of 50 percent by weight, but the preferred concentration is from about 1.0 to about 10 percent by weight, which ensures a smooth hand to the structure. At the higher concentrations of bonding agent, stiffness is a factor, but it is acceptable in laminating applications.

It is also possible to size the glass fibers with compositions comprising the bonding agent, e.g. polyvinyl alcohol, and thereby having a built-in bonding agent for the formed structure. This polyvinyl alcohol however would have to possess the capacity of being put into solution during the dispersing of the glass fibers and then being reprecipitated during the formation of the structure, so that it would not drain from the structure. Subsequent heating softens the polyvinyl alcohol so that it functions as a bonding agent for the structure.

Through extensive experimentation and investigation it has been found that at a pH of from 2.0–2.5, the bundles of glass fibers open somewhat, but when a particulate material, such as clay is added to the slurry, the fibers completely separate. However, when the pH is raised to about 2.9–3.0 reagglomeration of the fibers occurs and progressively get worse at higher pH values. But upon the addition of sodium hexametaphosphate to the slurry, the pH can be raised to about 6.5 without reagglomeration. The reason or mechanism for this behavior has not yet been identified. Further observations conclude that fibrous bundles, sized with conventional materials, cannot be opened without damage at pH values of from 2.6–6.5. Apparently, particulate materials, such as clays, help open fibrous bundles and once opened, the clay also helps prevent reagglomeration, at pH values of 2.5 and below. This is not true for pH values above 2.5 unless sodium hexametaphosphate is added thereto.

It is also thought that the combination of the particulate material and the sodium hexametaphosphate provides a zeta potential to the dispersion which aids in separating the individual glass filaments from the bundles and also aids in keeping the filaments separated. The ionic charge on the particles in the aqueous slurry may be of the same or opposite charge of the glass fibers.

Another interesting observation is that as long as the pH value is below about 2.5, asbestos, micro-fibers, wood pulp, etc. can be added in place of clays without reagglomeration but if the pH value is raised above 2.5 reagglomeration occurs, even though sodium hexametaphosphate is present in the slurry. During the formation of a non-woven structure, preferably in sheet form, the clay and sodium hexametaphosphate are carried away by the removal of water from the structure, thereby yielding a structure comprising only fibrous material and bonding agent.

EXAMPLE III

| Ingredients | Preferred percent by weight | Percent by weight |
|---|---|---|
| Water (40–110° F.) | Balance | |
| Water (70–90° F.) | | Balance. |
| Sodium hexametaphosphate | | 0.025–0.150. |
| Sodium hexametaphosphate | 0.075 | |
| Clay | | 0.05–0.5. |
| Hydrous aluminum silicate | 0.15 | |
| Chopped glass fibers | | 0.05–1.5. |
| Chopped ¼ inch glass fibers | 0.5 | |
| Binding agent | | 1.0–10.0. |
| Polyvinyl alcohol fibers | 5.0 | |
| Mineral acid | | As required. |
| Sulfuric acid | As required | |

The sodium hexametaphosphate, the glass fibers and the hydrous aluminum silicate were added to the water with vigorous agitation, using a Lightnin Mixer until good fiber dispersion was obtained. Sodium hydroxide was then added to raise the pH to about 4.5–6.5. Subsequently the polyvinyl alcohol was added to the dispersion in preparation for the formation of paper sheets on conventional paper-making apparatus. Usually, the weights of the sodium hexametaphosphate and the hydrous aluminum silicate are based upon the weight of glass fibers used.

Using the inventive dispersion technique, non-woven structures or paper sheets were made from bundles of chopped glass fibers having diameters of 3.8, 6.3 and 8.9 microns respectively. Lighter weight, higher strength structures were obtained with the 3.8 micron fibers. Structures were produced which were 5 pounds per 3,000 square feet, 10 pounds per 3,000 square feet and 20 pounds per 3,000 square feet from 3.8, 6.3 and 8.9 micron fibers respectively. To aid in understanding the differences between glass fibers of varying diameter and their inherent characteristics, the following table is presented:

TABLE I

| Glass fiber diameter (microns) | Denier | Relative No. of fibers | Bending stiffness | No. of cells[1] | Surface area[2] |
|---|---|---|---|---|---|
| 3.8 | ¼ | 6 | 1 | 15 | 2,100 |
| 6.3 | ¾ | 2 | 9 | 2.8 | 1,150 |
| 8.9 | 1½ | 1 | 36 | 1 | 790 |

[1] Relative number of cells was calculated at equal bulk densities assuming the fibers to be equally distributed in three planes at right angles to each other.
[2] Surface area is in square feet per pound.

The differences in physical characteristics of the glass fibers described in Table I are responsible for the differences in the properties of non-woven structures made from the respective glass fibers as seen in Table II, which follows:

TABLE II.—PROPERTIES OF NON-WOVEN STRUCTURES (SHEETS)

| Glass fiber diameter (microns) | Weight, lb./ 3,000 ft.² | Caliper mils | Breaking strength, lb./inch | Tear strength, gms./sheet | Air permeability, ft.³/ft.²/min. | MIT flex, 50 gm. load |
|---|---|---|---|---|---|---|
| 3.8 | 42 | 14.0 | 3.6 | 77 | 63 | 36 |
| 6.3 | 42 | 13.8 | 1.6 | 59 | 194 | 8 |
| 8.9 | 44 | 14.1 | 0.6 | 27 | 352 | 2 |

The sheets were bonded with 3 percent carboxymethyl cellulose, and the air permeability was measured at 0.5 inch of water pressure.

The wet web or structure demonstrated adequate strength for processing but when the web became dry, its strength decreased sharply. To compensate for the low strengths of the dry webs, low percentages of from about 2 to 10 percent of a binder was added thereto. Examples of binders that performed satisfactorily include polyvinyl alcohol fibers, heavily beated pulp, asbestos, and acrylics. Table III illustrates the effect of increasing binder content in a non-woven structure; polyvinyl alcohol is the binder and the structure is 20 pounds per 3,000 square feet or 1.0 ounce/square yard.

TABLE III

| Fiber diameter (microns) | Property | Polyvinyl alcohol content | | | | |
|---|---|---|---|---|---|---|
| | | 2% | 4% | 6% | 8% | 10% |
| 3.8 | Breaking strength (lb./inch). | 3.0 | 3.6 | 4.4 | 6.8 | 8.6 |
| 3.8 | Tear strength (grams/sheet). | 79 | 79 | 72 | 59 | 54 |

When blending glass fibers with pulp, the glass fiber dispersion should be prepared separately from the pulp dispersion and then subsequently combined in a suitable tank. In this manner the glass fibers are not damaged during the beating of the pulp and because the pH of the glass fiber slurry or dispersion has been adjusted to approximately 6.5, the pulp is not degraded. Degradation of the pulp by strongly acidic solutions used to initiate glass fiber dispersion has always been a problem in the art. Unexpectedly, the glass fiber dispersion was capable of having its pH raised from about 2.5 to about 6.5 without reagglomeration. Unlike non-woven structures produced completely from glass fibers, pulp/glass admixes retain a substantial amount of particulate materials, such as clays, which are used to help disperse the glass fibers.

It has been observed that there is no absolute fiber length for a given glass fiber diameter, but generally for 3.8 micron fibers, ¼ inch chopped strands performed best. Likewise for 6.3 micron fibers, ⅜ inch was the preferred length and for 8.9 micron fibers ½ inch was the preferred length, and for 12.0 micron fibers, ½ to ¾ inch was the preferred length of the glass fibers. The preference for certain lengths for specific fiber diameters is largely a function of the stiffness of the fibers and is also a function of the mixing equipment. As the number of fibers per unit weight increases, in the case of finer diameter glass fibers, the more difficult it is to dipserse the fibers. Therefore, the length of the fiber is usually decreased as the fiber diameter is decreased.

Generally any primary attenuated glass filaments or fibers that are sized and gathered into a strand or bundle and subsequently chopped, can be used with the inventive dispersion technique. Of course the dispersion technique is also applicable with blown micro-fibers but the disadvantages of using the micro-fibers as heretofore mentioned, directed our effects to the primary attenuated glass fibers.

One starch containing size that was applied to the glass fibers prior to their being gathered into a strand and chopped into uniform lengths is described in U.S. Pat. 3,472,682. The size did not interfere with the dispersion of the glass fibers. It was noted however that certain sizes cause the dispersion rate to increase or decrease depending on the film former and other constituents therein. For example, silane containing sizes usually decreases the dispersion rate.

Following is an example of how the fiber diameter of glass fibers, when properly dispersed affects the properties of a formed sheet of paper bonded with 5 percent polyvinyl alcohol fibers:

TABLE IV

| Properties of formed sheet | Fiber diameter— | | | | |
|---|---|---|---|---|---|
| | 3.8 micron fiber | A- micro fiber | AA- micro fiber | AAA- micro fiber | AAAA- micro fiber |
| Weight, oz./sq. yd | 1.1 | 1.1 | 1.0 | 1.1 | 1.1 |
| Thickness, inches | .0089 | .0085 | .0082 | .0102 | .0087 |
| Breaking strength, lbs./inch | 5.1 | 0.8 | 1.3 | 1.9 | 2.0 |
| Tear strength, grams/sheet | 100 | 12.3 | 15.0 | 16.7 | 13.8 |
| Bursting strength, Mullen points | 4.6 | <0.2 | <0.2 | <0.2 | <0.2 |
| Air permeability, cu. ft./min./sq. ft | 49 | 122 | 29 | 6 | 3 |

The air permeability was measured at 0.5 inch of water pressure.

The glass composition of the 3.8 micron fibers was E-glass, but there is no limitation on the type of glass that is applicable with the inventive dispersion technique. It is observed that the breaking strength, tear strength and bursting strength for the sheets formed from 3.8 micron fibers are greatly in excess of the sheets formed with blown fibers.

The structures that are formed from our dispersion, usually in sheet form, have been pigment-padded, coated and printed upon without destroying the quality of the paper. In fact, the quality of the printing, etc. was excellent.

The length of time that the glass fibers are kept at a pH of between 2.0 and 2.5 in the dispersion is a function of the temperature of the water, fiber diameter and number of filaments per bundle, amount and type of sizing on the glass strands, and the degree and type of agitation given to the fibers. It is thought by some that if the glass fibers are exposed to a low pH for a sufficient period of time, that the glass fibers are attacked and the soda and lime rom the glass is leached out, leaving a thin gelatinous layer, rich in silica, which functions as an adhesive.

As the fiber diameter is increased, the number of fibers per unit weight decreases. Therefore, since the concentration of the dispersion slurry is on a weight basis, the upper limit of the concentration of coarser fibers in the dispersion can be increased. Combinations of fiber diameters may be used when practicing this invention, but it is preferred to use only one fiber diameter in the dispersion.

It has been observed that coarse glass fibers are capable of producing heavier weight non-woven structures or papers without surface distortions, than fine diameter glass fibers. Smooth surface structures are capable of being produced with glass fibers having a nominal fiber diameter of 3.8 microns up to a 40 pound basis (40 pounds per 3,000 square feet) and up to 200 pound basis (200 pounds per 3,000 square feet) with 6.3 micron nominal fiber diameters, and up to 400 pound basis (400 pounds per 3,000 square feet) with 8.9 micron nominal fiber diameters.

The thickness of the non-woven structures range from 1 to 15 mils, 2 to 30 mils, 5 to 500 mils and 10 to 1,000 mils for 3.8, 6.3, 8.9 and 12.0 micron norminal diameter glass fibers respectively.

However, when finer diameter glass fibers are used in a heavier weight non-woven structure, a consistently inconsistent pattern or bumpy distortion develops on both surfaces of the formed structure. However, the distortion is more prominent on one side than the other. For example, when glass fibers having a diameter of about 3.8 microns are dispersed according to the inventive concepts hereinabove described, an unexpected, attractive pattern develops on the surfaces of the formed structures when the basis weight is 40 pounds per 3,000 square feet or more. With these heavy structures, some of the particulate material, such as clay, used to aid the dispersion of glass fibers, is retained in the structure.

The unexpected rippled or bumpy effect has only been observed with the glass fibers having a fiber diameter of 3.8 microns. These fibers are commercially available under the trade designation, "BETA" from Owens-Corning Fiberglass Corporation.

It is theorized that because the glass fibers, having a 3.8 micron diameter, are more flexible and because the fibers have a slower rate of drainage than glass fibers having fiber diameters of 6.3 microns or greater, the rippled effect is peculiar to only the smaller diameter fibers. Also, because of the larger surface area of the fine diameter fibers, it is theorized that air is entrapped within the structurue, thereby bringing about the decorative effect.

The rippled effect can be further described as a three-dimensional, consistently non-uniformly oriented, serpentine or worm-like configuration.

When forming a rippled sheet from a 3.8 micron glass fiber dispersion, the concentration of the slurry can be the same as for the production of smooth sheets, but the wire speed or belt speed of the paper-making machine is slowed down. The rippled effect is thought to be a function of the basis weight of the paper and also a function of the drainage rate of the water from the mass on the wire. Because the rippled effect appears to be limited to the use of 3.8 micron fibers, the cause of the effect is thought to be analogous to very thin hair which tends to curl and bend more easily than coarser hair. Consequently, during the drainage of water on the wire, curling and buckling of the fibers is though to occur which tends to form worm-like configurations, part of which collapse, and part of which entrap air to form cell-like areas above the normal surface of the structure. These cell-like areas or peaks appear on one surface and range from about 5 to 150 mils, but the effect may be accentuated by varying the rate of drainage or by varying the belt speed of the paper-making machine. Likewise, there appears to be depressions, wrinkles, or troughs on the other side which range from about 10 to 20 mils from the normal surface of the structure. When the dried rippled sheet is compressed, the effect springs back into its original position.

It has been observed that as the pH of the slurry in the head-box of a paper-making machine is raised slightly, it is possible to obtain the rippled effect more quickly, assuming constant thickness of the structuure and constant line speed of the forming wire, when compared to a slurry having a lower pH. However, when the formed structure is of a thickness of at least about 20 mils, pH appears to play no role. Also, when an anti-foam agent, such as a silicone was added to the slurry at the head-box, the rippled effect, normally produced was not obtainable.

It has also been observed that the rippled effect appears to be a function of fiber length. For example, the 3.8 micron fibers having a uniform length of about ¼ inch produced the best results, whereas fiber lengths of about ⅛, ⅜ and ½ inch did not yield the rippled effect as easily or as prominently.

When our dispersion technique is employed to fully disperse fibrous materials, especially glass fibers, and the dispersion is used in conjunction with conventional paper-making apparatus, such as the inclined wire, the Rotoformer or the Fourdrinier machines, structures are obtained which possess properties far superior to those obtained from the teachings of the prior art.

Because glass fibers, as well as other synthetic fibers, drain so rapidly on a forming wire, some machines are preferred over others. For example some machines, such as the inclined wire and the Rotoformer are designed for rapid drainage and are preferred when using low concentrations of long fibers. The formed structures are of a uniform quality, without the presence of voids and/or thick spots.

Generally, the steps involved for producing non-woven structures from our dispersions of fibrous materials comprises dispersing glass fibers in an amount of about 0.5 to 1.0 percent by weight in an acid medium having a pH of from about 2.0 to about 2.5 in the presence of particulate materials and sodium hexametaphosphate. The pH of the acidic medium is raised to substantially the neutral point after the glass fibers have been completely separated. If reagglomeration of the glass fibers occurs, such as by accidentally raising the pH above the neutral point, simply adjusting the pH to a lower value coupled with mixing completely redisperses the fibers. Optionally, previously beaten natural and/or synthetic fibers are added to the neutral glass fiber dispersion. Subsequently, the acidic medium comprising fully dispersed or separated fibers, is diluted to about 0.01 percent to 0.02 percent by weight of fibers, and a binding agent is added thereto, which binding agent is usually activated in the formed structure by the application of heat. The diluted mass of fibers is then brought into contact with a wire or screen which allows the water to pass therethrough. Usually a vacuum is applied to the wire to further drain the water therefrom, but it is not always necessary. It is noted that with glass fibers alone or in admixture with natural or synthetic fibers, pressing or calendering of the formed sheet is not necessary because of the quick rate of drainage. The formed structure is advanced to a drying zone, such as an oven, infra-red lamps on either side of the structure or steam-heated cylinders. It is in this heating zone that the binding agent, preferably polyvinyl alcohol fibers, is dissolved in available water and caused to flow throughout the structure. Commercial grades of polyvinyl alcohol fibers are commonly dissolved in water at temperatures of 140, 160 and 180° F. After the formed structure exits from the heating zone, the cooling effect of the surrounding air at room temperature establishes the position of the binding agent and thereby adds dimensional stability to the structure. Collection on a take-up device such as a roll, is common so that the structure may be stored for further use or may be further treated such as by printing or other finishing techniques.

Employing the inventive dispersion technique with the above-described paper-making apparatus, continuous sheets of uniform quality were obtained, having widths of from 18 inches to about 65 inches. Laboratory testing apparatus, prior to the use of commercial apparatus, was limited to a Williams Sheet Mould which has a stationary screen.

The rippled effect was obtained on an inclined wire machine, but there is no reason to indicate that the effect could not also be obtained on the other machines.

We claim:

1. A method of dispersing chopped bundles of glass filaments for use in the manufacture of non-woven structures, comprising the steps of:
   forming a mixture comprising water, sodium hexametaphosphate, an inorganic particulate material, chopped bundles of glass filaments, and a mineral acid sufficient to lower the pH of the initial mixture to about from 2.0 to about 2.5;
   agitating the mixture sufficiently until substantially all of the filaments have separated from the bundles, but insufficiently to cause breakage of the filaments once separated; and
   raising the pH of the mixture to about 4.5 to 6.5, whereby the filaments remain substantially uniformly dispersed for extended periods of time.

2. The method as claimed in claim 1 wherein the sodium hexametaphosphate is present in the mixture in an amount of from about 0.025 to about 0.15 percent by weight.

3. The method as claimed in claim 1 wherein the particulate material is selected from the group consisting of hydrous aluminum silicates, magnesium silicates and attapulgus clays, having a particle size ranging from about 0.2 to about 4.8 microns, and wherein the particulate material is present in the mixture in an amount of from about 0.05 to about 1.5 percent by weight.

4. The method as claimed in claim 1 wherein the glass filaments have a fiber diameter ranging from about 3.8 to about 12.0 microns.

5. The method as claimed in claim 1 wherein the glass filaments have a sizing material thereon prior to addition of the filaments to the mixture.

6. The method as claimed in claim 1 wherein the glass filaments are present in the mixture in an amount of from 0.05 to about 1.5 percent by weight.

7. The method as claimed in claim 1 wherein a binding agent is added to the mixture after the pH has been raised to about 4.5 to 6.5.

8. The method as claimed in claim 7 wherein the binding agent is selected from the group consisting of polyvinyl alcohol fibers, acrylics and wood pulp, and wherein the binding agent is present in the mixture in an amount of from about 1.0 to about 10.0 percent by weight.

9. In a process of making fibrous non-woven structures from a slurry of fibrous materials, comprising the steps of dispersing glass fibers from a plurality of bundles in an acidic medium, and distributing the slurry onto a moving foraminous belt of a paper-making apparatus, the improvement whereby stability is obtained in the dispersion by preventing reagglomeration of the glass fibers, comprising the steps of maintaining the pH of the acidic medium between 2.0 and 2.5 during the separating of the glass fibers from the bundles, and adding particulate material and sodium hexametaphosphate during the separating of the glass fibers from the bundles to form a uniform dispersion of glass fibers, and subsequently raising the pH of the dispersion to about 4.5 to 6.5.

10. In the process as claimed in claim 9, the improvement further comprising adding a binding agent to the mixture after the pH has been raised to about 4.5 to 6.5.

11. The process as claimed in claim 10 wherein the binding agent is polyvinyl alcohol fibers and wherein the polyvinyl alcohol fibers are present in an amount of from 1.0 to 10.0 percent by weight.

12. The process as claimed in claim 9 wherein the particulate material is hydrous aluminum silicate having a particle size ranging from about 0.2 to about 4.8 microns, and wherein the hydrous aluminum silicate is present in the dispersion in an amount of from about 0.05 to about 1.5 percent by weight.

13. The process as claimed in claim 9 wherein the sodium hexametaphosphate is present in an amount of from about 0.025 to about 0.15 percent by weight.

14. The process as claimed in claim 9 wherein the glass fibers have a fiber diameter of about 3.8 microns and a length of about ¼ inch.

15. The process as claimed in claim 14 wherein the glass fibers are present in the dispersion in an amount of from 0.05 to about 1.5 percent by weight.

16. In the process as claimed in claim 9 the improvement further comprising imparting a randomly oriented rippled effect to the structures by employing glass fibers having a nominal diameter of 3.8 microns and a uniform length of about ¼ inch and by making the structures of a weight of more than 40 pounds per 3,000 square feet.

17. In a process for forming non-woven structures comprising admixes of glass fibers and other natural or synthetic fibers the improvement comprising dispersing glass fibers in an acidic medium at a pH of from about 2.0 to about 2.5 in the presence of particulate material and sodium hexametaphosphate, raising the pH of the acidic medium to from about 4.5 to about 6.5, and combining the natural or synthetic fibers with the dispersion when the pH of the acidic medium is from about 4.5 to about 6.5, so that the natural or synthetic fibers are not degraded in quality by the acidic medium and wherein the glass fibers are of uniform length and do not reagglomerate.

18. In a process for forming sheet-like structures from a dispersion of glass fibers, comprising dispersing fibrous materials in an acidic medium, diluting the dispersion, contacting the diluted dispersion with a forming wire, draining excess water from the formed structure, heating the structure to drive residual water from the structure and collecting the dried structure, the improvement wherein the glass fibers are completely dispersed without decreasing the length of the glass fibers and wherein the glass fibers do not irrevocably reagglomerate, comprising adding glass fibers, particulate material, and sodium hexametaphosphate to an aqueous medium having a pH of from about 2.0 to about 2.5, applying shear to the aqueous medium so that the glass fibers substantially separate, and adjusting the pH of the aqueous medium to from about 4.5 to about 6.5.

19. In the process as claimed in claim 18 the improvement further comprising adding natural or synthetic fibers, previously beaten, to the dispersion of glass fibers after the aqueous medium has been adjusted to a pH of from about 4.5 to about 6.5.

20. In the process as claimed in claim 18 the improvement further comprising adding a binding agent to the aqueous medium after the aqueous medium has been adjusted to a pH of from about 4.5 to about 6.5.

References Cited
UNITED STATES PATENTS

| | | | |
|---|---|---|---|
| 3,573,158 | 3/1971 | Pall et al. | 162—156 X |
| 2,787,542 | 4/1957 | Labino | 162—156 |
| 2,694,630 | 11/1954 | Landes et al. | 162—156 |
| 3,622,445 | 11/1971 | Heidweiller | 162—156 X |
| 2,932,601 | 4/1960 | Hawley et al. | 162—145 |
| 3,103,461 | 9/1963 | Smith et al. | 162—156 X |

S. LEON BASHORE, Primary Examiner

A. L. CORBIN, Assistant Examiner

U.S. Cl. X.R.

162—156, 183